United States Patent
Spencer et al.

[11] Patent Number: 6,074,164
[45] Date of Patent: Jun. 13, 2000

[54] METHOD OF GRASPING, ALIGNING AND ORIENTING AN OBJECT

[75] Inventors: Timothy F. Spencer; Gerald N. Walter, both of Rochester, N.Y.

[73] Assignee: Eastman Kodak Company, Rochester, N.Y.

[21] Appl. No.: 09/386,117

[22] Filed: Aug. 30, 1999

[51] Int. Cl.[7] .............................. B65G 47/24; B25J 15/06
[52] U.S. Cl. .................... 414/816; 294/64.1; 414/783
[58] Field of Search .................. 294/64.1; 414/759, 414/763, 774, 775, 783, 816

[56] References Cited

U.S. PATENT DOCUMENTS

| | | | |
|---|---|---|---|
| 3,462,917 | 8/1969 | Nakashima | 294/64.1 X |
| 4,564,332 | 1/1986 | Orii | 414/763 X |
| 5,020,842 | 6/1991 | Miwa et al. | 294/64.1 X |
| 5,176,022 | 1/1993 | Sartorio | 294/64.1 X |
| 5,201,875 | 4/1993 | Tessier et al. | 294/64.1 |
| 5,882,055 | 3/1999 | Smith | 294/64.1 |

FOREIGN PATENT DOCUMENTS

| | | | |
|---|---|---|---|
| 3-187239 | 8/1991 | Japan | 294/64.1 |

*Primary Examiner*—Janice L. Krizek
*Attorney, Agent, or Firm*—Clyde E. Bailey, Sr.

[57] ABSTRACT

A method for grasping, aligning and orienting an object uses first and second rotatable arm members each having object holders, respectively. An object holder each comprises a vacuum recess and alignment features to align the object in a fixed position in its respective vacuum recess. Rotation of first rotatable arm member into abutting contact with second rotatable arm member forms a formable vacuum chamber. Partially closed vacuum chamber has a closed end for positioning the object, a first wall defined by the first vacuum recess, an opposing spaced apart second wall defined by the second vacuum recess and an open end between the first and second walls for receiving the object in the partially closed vacuum chamber.

3 Claims, 6 Drawing Sheets

METHOD OF GRASPING, ALIGNING AND ORIENTING AN OBJECT

CROSS-REFERENCE TO RELATED APPLICATIONS

The present application is related to U.S. application Ser. No. 09/385,150, filed Aug. 30, 1999, by Timothy F. Spencer, and Gerald N. Walter and entitled, "Apparatus For Aligning And Orienting an Object," and U.S. application Ser. No. 09/385,260, filed Aug. 30, 1999, by Timothy F. Spencer, and Gerald N. Walter and entitled, "Vacuum Assisted Assemblage For Handling Objects."

FIELD OF THE INVENTION

The invention relates generally to the field of robotic manipulation of an object or component part. More particularly, the invention concerns a method of grasping, precisely aligning and orienting an object, such as a lens, for precision independent processing.

BACKGROUND OF THE INVENTION

During the robotic manufacturing process of small electro-optical assemblies it is often necessary to perform production processes on a component surface that is not easily accessible due to the orientation in which the component part must be acquired. Furthermore, the ability to acquire these components from a known registered position is not always possible, even though the final process may necessitate exact component location. Consequently there has historically been a need to both reorient and exactly position a component part acquired by a robotic manipulator.

U.S. Pat. No. 4,778,332, titled, "Wafer Flip Apparatus," by Byers et al., Oct. 18, 1988, describes a device used for component reorientation. The disclosed device reorients a component part by rotating it through a fixed angle, however contact with the part is from one side only and consequently the device is not able to present alternate surfaces to a production process. For this to be accomplished, it would require a transfer to a secondary fixture, resulting in added hardware costs and cycle time. Furthermore, this device does not correct the orientation of the component part as it is picked, consequently the placement location could be no better than the acquired location. Not only would these processes require the expense and space of additional hardware, but would also significantly add to the overall robotic production cycle time.

Moreover, such secondary fixtures as described in, for instance, Statutory Invention Registration No. H422, titled "Apparatus For Inverting Articles and Method For Using Same" by Daniels et al., published Feb. 2, 1988, have been widely used for some time. However, these devices do not possess the capability to exactly correct the location of the component's acquired position.

Where reorientation of the part relative to the picking mechanism has been demonstrated without the use of a secondary fixture, for instance as disclosed in U.S. Pat. No. 5,201,875, titled "Probe and Inverting Apparatus" by Tessier et al., Apr. 13, 1993, the complete mechanism requires several discrete actuators. Furthermore, such picking mechanisms make no provision to exactly correct the location of the acquired position.

Therefore, a need persists for a method for grasping and precisely aligning an object and then orienting it for independent processing without incurring the problems experienced in the prior art.

SUMMARY OF THE INVENTION

It is, therefore, an object of the invention to provide a method for grasping, aligning and orienting a fragile object or component part, such as a lens, for processing.

It is another object of the invention to provide an object reorientation method that does not require additional handling steps.

It is yet another object of the invention to provide a method for handling an object that is uses compact and light-weight elements for robotic object manipulation.

It is a feature of the invention that a partially closed vacuum chamber formed by snugly abutting object holders or suction chambers in rotatable first and second arm members is used for grasping an object for reorientation.

To achieve these and other objects, features and advantages of the invention, there is provided, in one aspect of the invention, a method of grasping, aligning and orienting an object, comprising the steps of:

providing a formable vacuum chamber having a closed end for aligning the object contained therein and an open end for receiving the object, said formable vacuum chamber comprising first and second rotatable arm members, said first rotatable arm member having a first vacuum recess and said second rotatable arm member having a second vacuum recess, said first and second vacuum recesses forming said vacuum chamber when said first rotatable arm member rotates into abutting contact with said second rotatable arm member, respectively, for forming a vacuum chamber, said vacuum chamber having a closed end for aligning said object and an open end for receiving said object;

rotating said first and second rotatable arm members into abutting contact such that said respective first and second vacuum recesses form said formable vacuum chamber having a closed end and an open end;

positioning said open end of said vacuum chamber in close proximity to said object to be grasped;

applying a vacuum to said vacuum chamber for drawing and securing said object within said vacuum chamber against said closed end;

removing vacuum from a select one of said first and second vacuum recess and retaining vacuum on the other of said first and second vacuum recess for holding said object on said vacuum recess; and, rotating said first rotatable arm member away from said second rotatable arm member with one of said vacuum recesses having a vacuum for securing said object.

The present invention has numerous advantageous effects over prior developments including: ease of use, compact elements, simple to develop, and cost effectiveness to implement.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
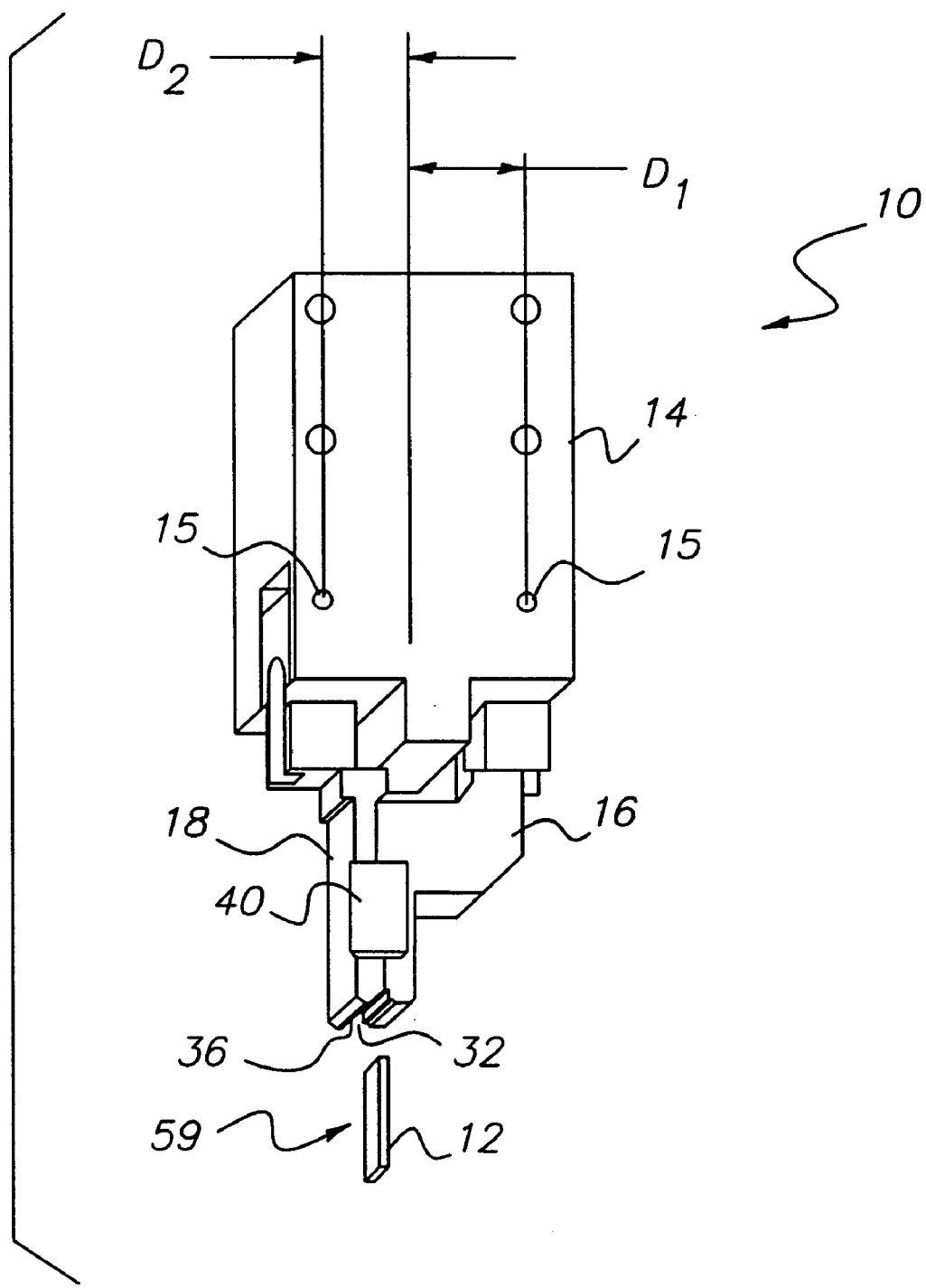
FIG. 1 is a perspective view of the apparatus of the invention in a closed state.
Figure 2:
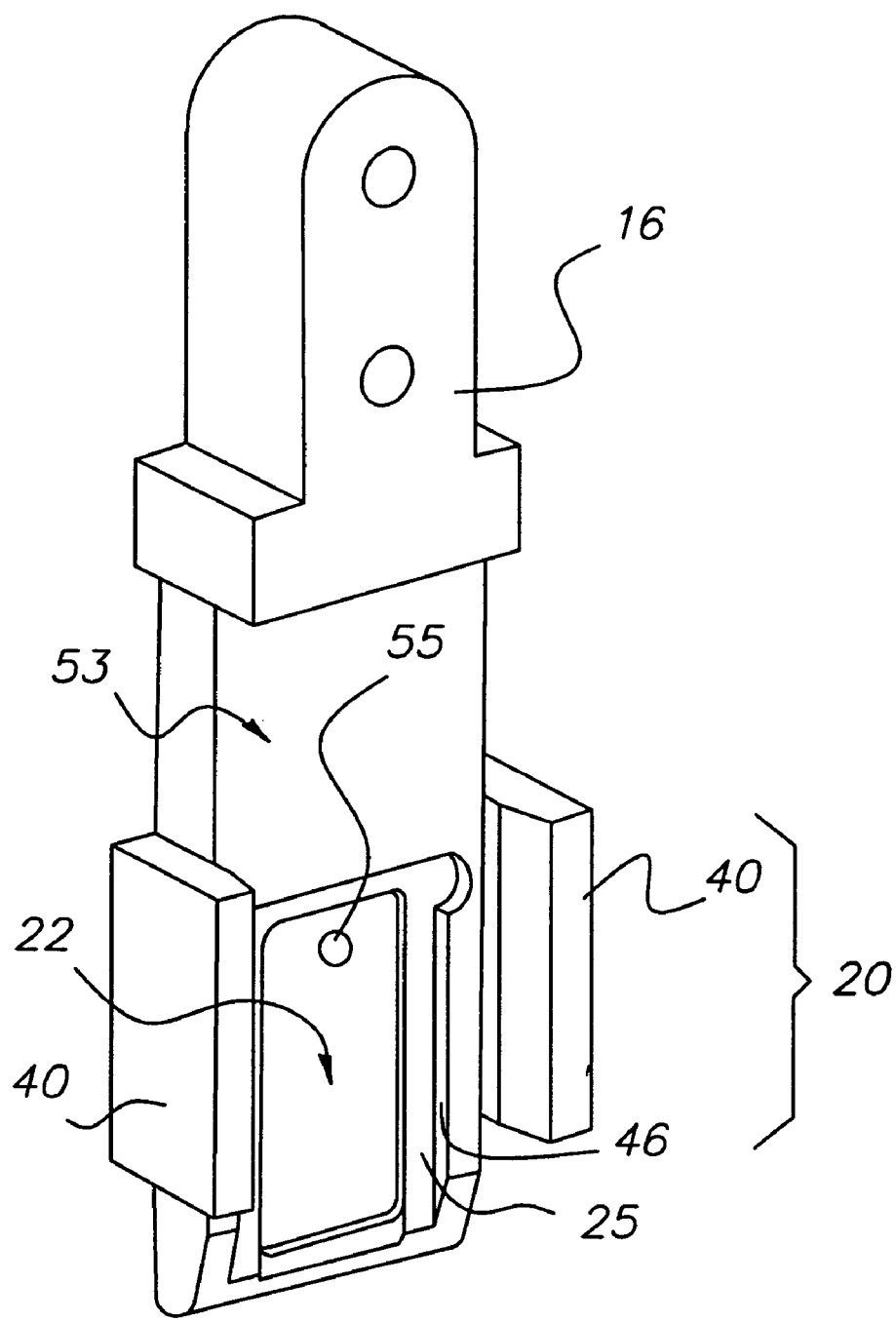
FIG. 2 is a perspective view of the first rotatable arm member of the invention.
Figure 3:
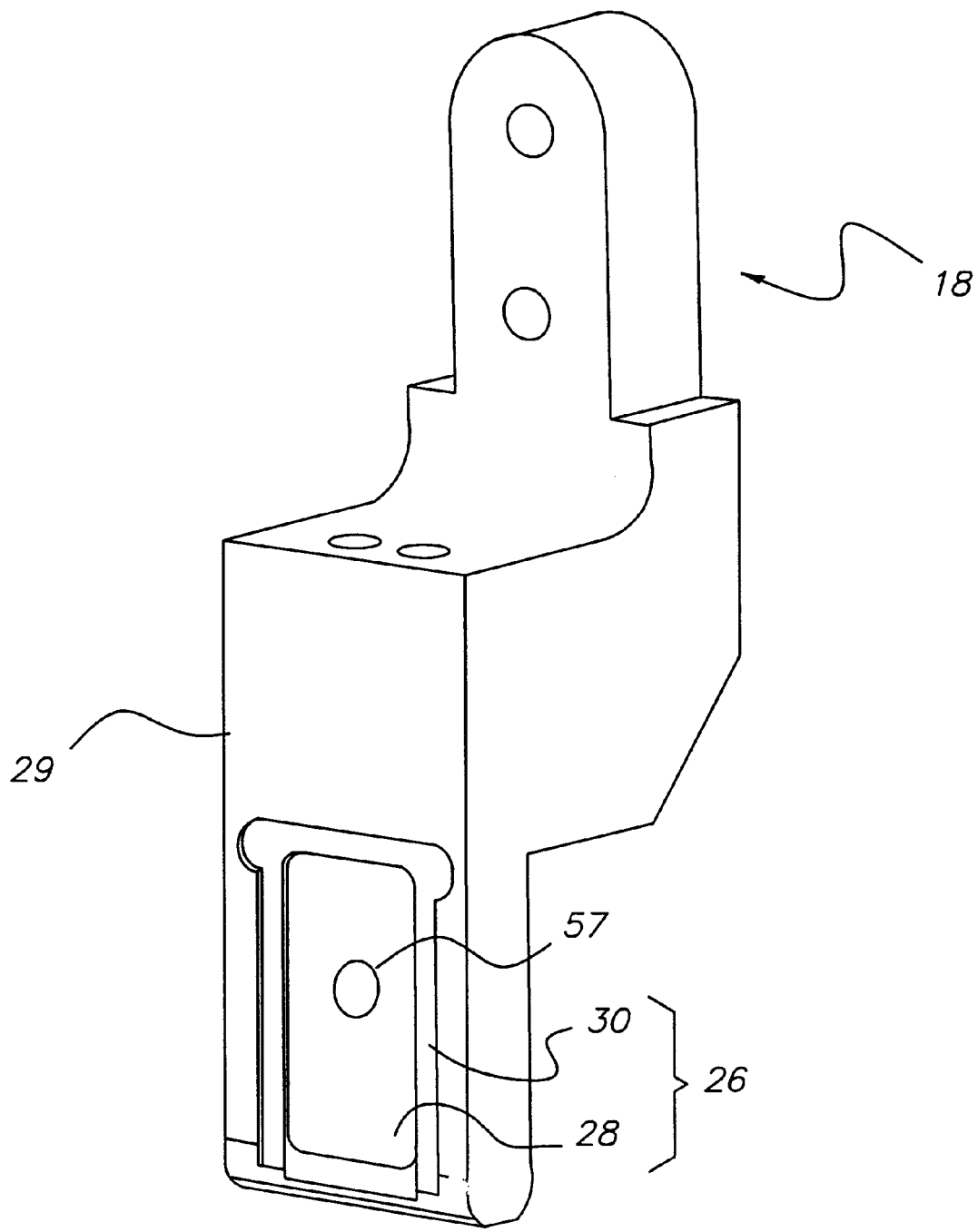
FIG. 3 is a perspective view of the second rotatable arm member of the invention.
Figure 7:
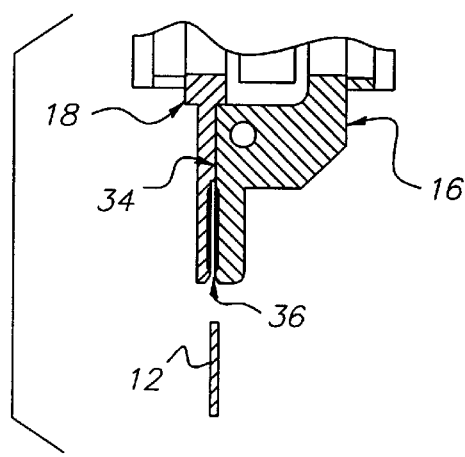
FIG. 7 is an enlarged view of the vacuum chamber structure formed by snugly abutting suction chambers.

Turning now to the drawings, and in particular to FIGS. 1, 2, and 7, apparatus 10 according to the principles of the invention is illustrated. In the preferred embodiment, apparatus 10 for aligning and orienting an object or component part 12, such as a lens, comprises cooperating first and second rotatable arm members 16, 18, respectively, operably connected to a single, common actuator 14. According to FIG. 2, first rotatable arm member 16 has a first object holder, alternately called suction chamber 20, comprising a first vacuum recess 22 supplied by vacuum port 55 and a first support surface 25 at least partially surrounding the first vacuum recess 22. First support surface 25 supports object 12 in a fixed position relative to vacuum recess 22. Similarly, according to FIG. 3, second rotatable arm member 18 operably connected to actuator 14 (shown in FIG. 5) has a second object holder, alternately called suction chamber 26, comprising a second vacuum recess 28 supplied by vacuum port 57 and a second support surface 30 at least partially surrounding the second vacuum recess 28. Alternatively, second support surface 30 supports the object 12 in a fixed position relative to vacuum recess 28. Vacuum ports 55, 57 may be connected to any conventional vacuum source (not shown) to provide sufficient vacuum within first and second vacuum recesses 22, 28.

Referring to FIG. 2, it is preferred that object holder or suction chamber 20 of first rotatable arm member 16 be formed by machining into the front face 53 a projection of the specific object or component part 12 to be grasped. The projection machined in front face 53 is an impression of the specific object 12. Therefore, the object holder 20 is made specifically for a particular object 12, such as a lens. The inventors have determined that an advantage of this projection machined in the front face 53 is that the component part 12 subject to processing will precisely fit inside the vacuum chamber 32, described in further detail below. Moreover, the projection machines in the front face 53 provides registration for the component part 12 in vacuum chamber 32. According to FIG. 2, in addition, the first arm member 16 has features 40 external to the first object holder or suction chamber 20, which insure proper alignment of either one of the cooperating rotatable arm members 16, 18 to the other one of the rotatable arm members 18, 16.

Figure 4:
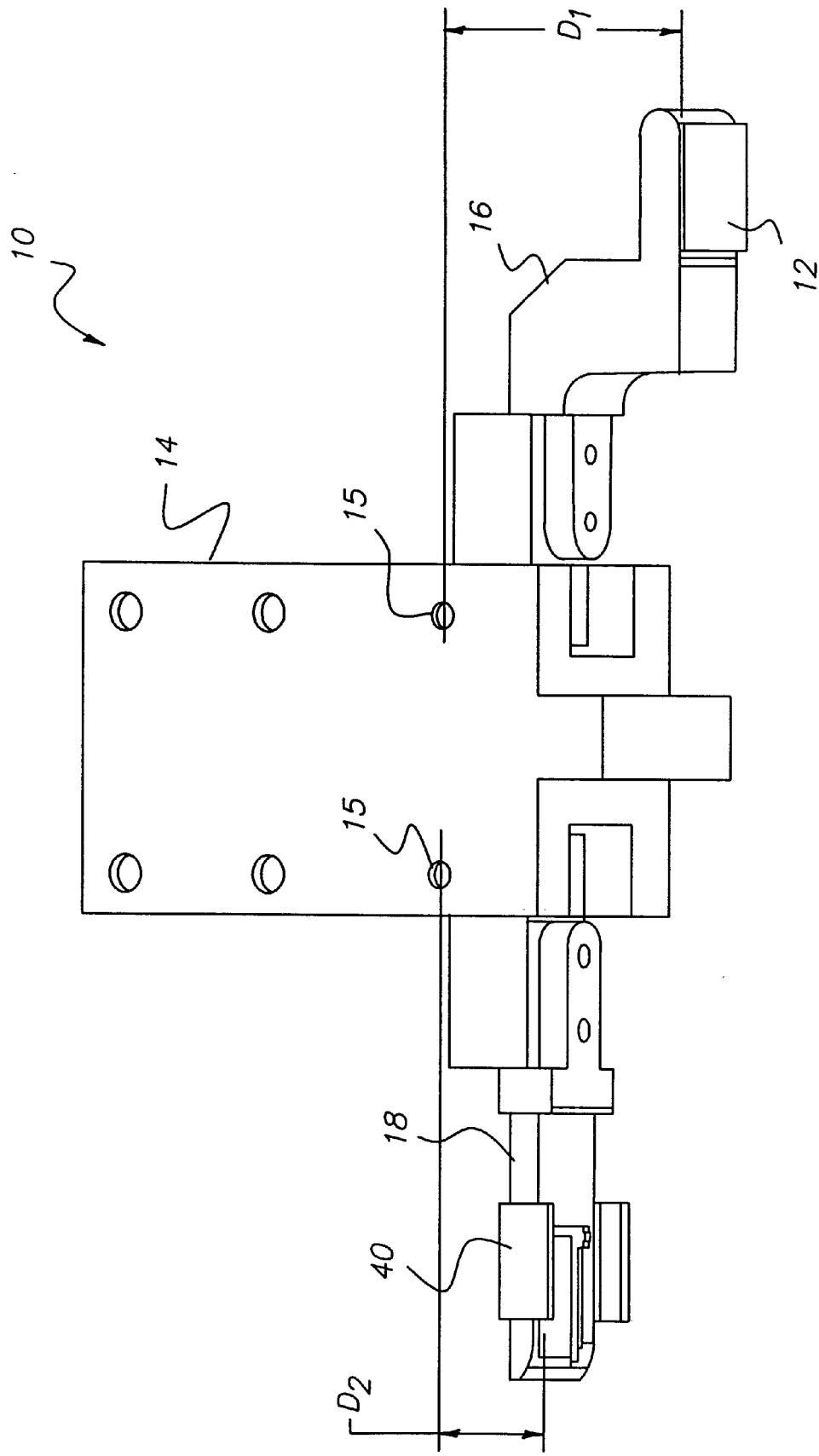
FIG. 4 is a perspective view of the apparatus with first and second rotatable arms in the fully extended open configuration.

Referring to FIGS. 1 and 4, another important feature of apparatus 10 is the existence of predetermined spacings or offsets $D_1$ and $D_2$ between spaced pivot points 15 in actuator 14 about which rotatable arms 16, 18 rotate from a fully extended configuration through substantially ninety degrees towards one another forming vacuum chamber 32. As seen clearly in FIG. 4, arm members 16, 18 in the fully extended configuration have offsets $D_1$ and $D_2$, respectively. $D_1$ defines the offset dimension from its pivot point 15 to the support surface 25 of rotatable arm member 16. Similarly, $D_2$ defines the offset dimension from its pivot point 15 to the support surface 30 of rotatable arm member 18. In our preferred embodiment, $D_1$ is greater than $D_2$ although they may be substantially equal.

Referring to FIG. 1, first and second arm members 16, 18 are rotatable by a single, common actuator 14 (illustrated in FIGS. 4 and 5) into contact with one another, such that object holders or suction chambers 20, 26 come together to form a vacuum chamber 32 for grasping object 12. Best seen in FIGS. 6 and 7, the open end 36 of the vacuum chamber 32 is then positioned, as by a robotic manipulator (FIG. 8), above a vertically oriented object 12, as from a rack (not shown). Both vacuum ports 55, 57 (depicted in FIGS. 2 and 3) are then activated as the open end 36 of the vacuum chamber 32 is lowered to a top end 59 of the object 12. The vacuum chamber 32 having vacuum applied to it causes the object 12 to be sucked into the open end 36 and against the closed end 34 of the vacuum chamber 32. The object 12 is now picked by the apparatus 10 of the invention and located to a known fixed reference edge defined by the closed end 34 of the vacuum chamber 32.

Figure 6:
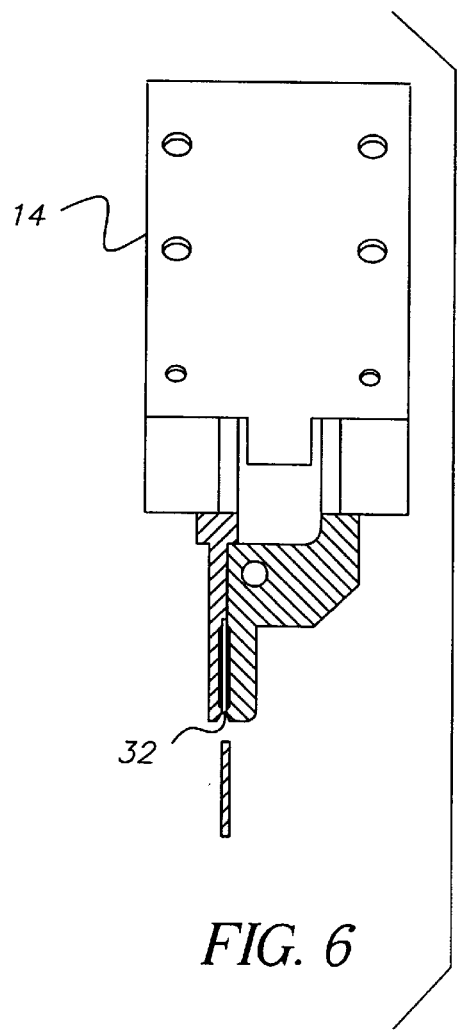
FIG. 6 is a front elevational view partially sectioned to show the partially closed vacuum chamber.

Referring to FIGS. 1, 4, and 6, single actuator 14 is configured for simultaneously rotating the first rotatable arm member 16 either away from (FIG. 4) or toward (FIG. 1) the second rotatable arm 18 about a respective pivot point 15. In either case, the object 12 is manipulated with a certain orientation. According to FIGS. 1 and 6, when first and second rotatable arm members 16, 18 are rotated towards one another about its respective pivot point 15 into abutting contact, a partially closed vacuum chamber 32 (described above) is formed for grasping the object (component or part) 12. As indicated, vacuum chamber 32 structurally has a closed end 34 for aligning the object or component part 12, a first wall 46 defined by the first support surface 25 (shown in FIG. 2), an opposing second wall 29 (best seen in FIG. 3) defined by the second support surface 30, and an open end 36 opposite the closed end 34 for receiving the object or component part 12.

Figure 8:
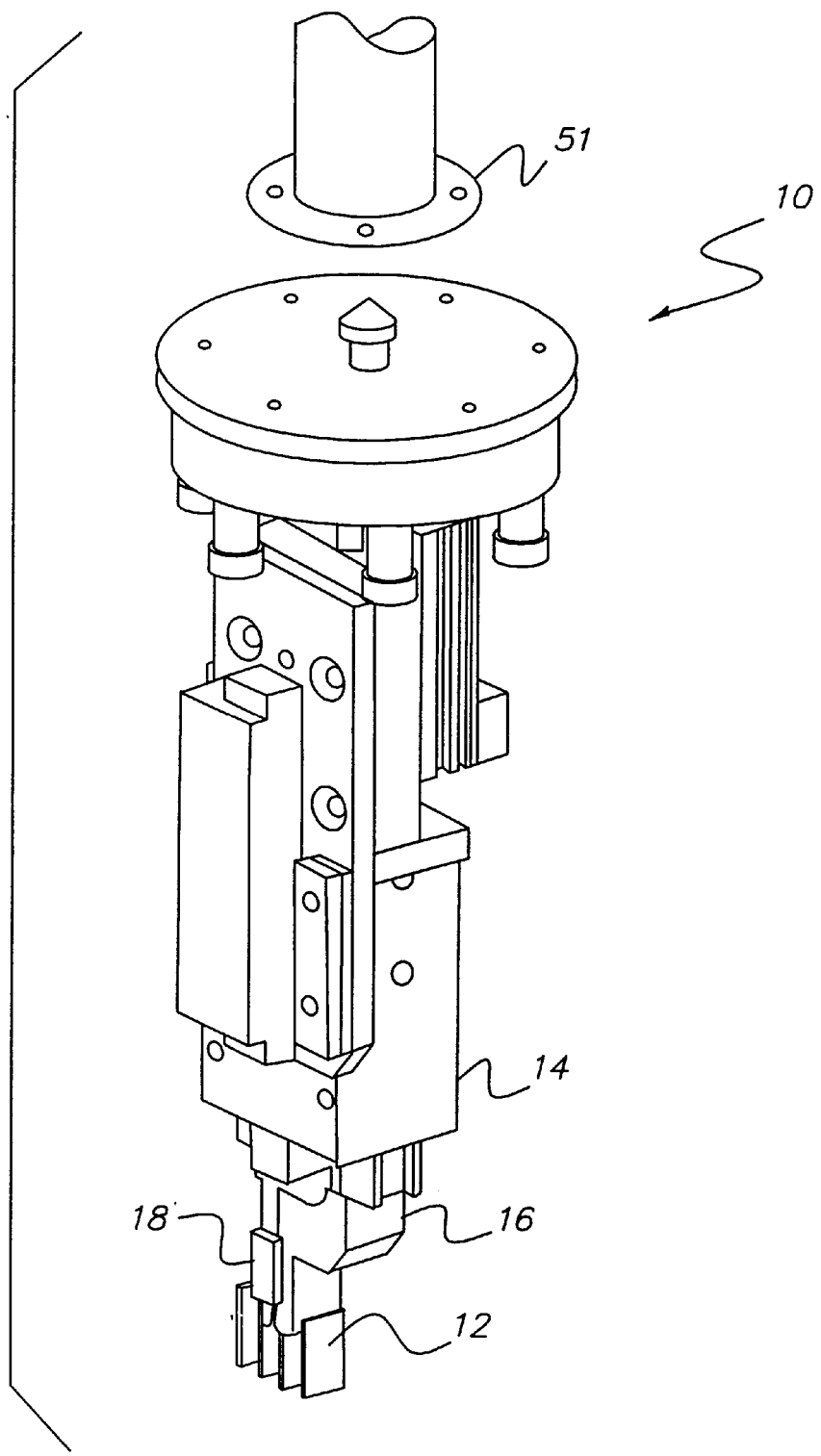
FIG. 8 is a perspective view of the apparatus of the invention showing a mounting flange adaptable to a robotic manipulator.

According to FIG. 8, apparatus 10 may be operably connected to a tooling flange 51 of a robotic manipulator (not shown), such that it can be moved throughout a space. In a preferred embodiment of the invention, single actuator 14 causes 90° opposed rotation of first and second rotatable arm members 16, 18, such that they may be either in parallel contact with one another or fully opposed in a co-planar fashion, as shown in FIGS. 1 and 4, respectively. While actuator 14 (FIG. 5) may be selected from among any number of commercially available actuators to rotate first and second rotatable arm members 16, 18, we prefer using a model RA-90 angular gripper, manufactured by Robohand Inc. of Monroe Conn., USA (see FIG. 1).

Figure 5:
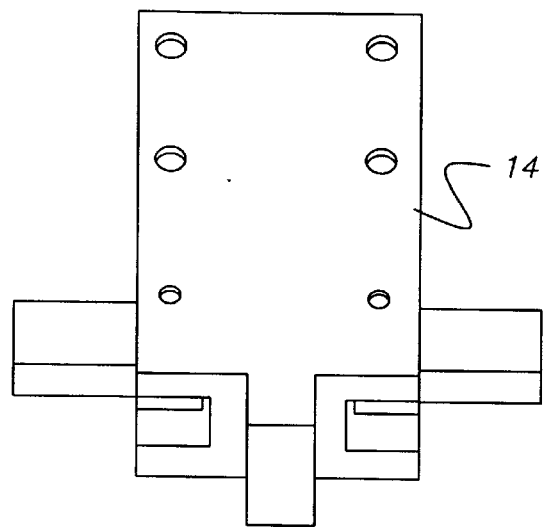
FIG. 5 is a slightly tilted perspective view of the actuator used in the apparatus of the invention.

In another aspect of the invention, a vacuum assisted assemblage for handling an object 12, such as a lens, comprises an actuator 14 and a formable vacuum chamber 32 operably connected to the actuator 14 (FIG. 5). As described above, vacuum chamber 32 includes cooperating first and second rotatable object holders or suction chambers 20, 26 each being operably connected to the actuator 14. Object holders or suction chambers 20, 26 are arranged for cooperative rotational movements between a first position and a second position. At the first position, first object holder or suction chamber 20 is positioned generally at an acute angle relative to the second object holder or suction chamber 26, as shown in FIG. 4. At the second position, peripheral surfaces of the first and second object holder or suction chambers 20, 26 snugly abut to form the formable vacuum chamber 32 for handling an object 12.

In operation, according to FIG. 4, during the movement of apparatus 10 by the robotic manipulator (not shown), the vacuum on either one of the first and second rotatable arm members 16, 18, is released and the arm members 16, 18 are simultaneously rotated to a fully extended configuration. In this instance, the object or component part 12 is retained by one of the object holders or suction chambers 20, 26 (shown only on 26) associated with one of the rotatable arm members 16, 18. The suction chamber 20, 26 retaining the object 12 would have an active vacuum still applied to it. By selectively applying vacuum to either one of the rotatable arm members 16, 18, alternate surfaces of the object 12 will be presented to this next process step. Because the re-orientation and alignment occurred during the motion of the robotic manipulator, the overall process cycle was not impacted.

In an alternative embodiment of the invention formed by rearranging the above process steps, the apparatus 10 of the invention may be utilized to pick a horizontally located object 12 and then to place the object 12 in a vertical orientation, as to a rack. Additionally apparatus 10 may be utilized to pick a horizontally located component passed through the vertical orientation while switching the vacuum ports 55, 57, and then placed in an inverted horizontal orientation.

Thus, in accordance with another aspect of the invention, a method of grasping, aligning and orienting an object 12 comprises the step of providing a formable vacuum chamber 32. As described above, formable vacuum chamber 32 has a closed end 34 for aligning the object 12 contained therein and an open end 36 for receiving the object 12. Further, formable vacuum chamber 32, as described above, comprises cooperating first and second rotatable arm members 16, 18. First and second rotatable arm members 16, 18 are rotated about a respective pivot point 15 into abutting contact such that the respective first and second object holders or suction chambers 20, 26 form the formable vacuum chamber 32, as described above. For grasping an object 12 such as a lens, the vacuum chamber 32 is positioned in close proximity to the object 12. Upon applying a vacuum to the vacuum chamber 32, the object 12 is then sucked into the vacuum chamber 32 and secured at the closed end 34 for subsequent manipulation. After the object 12 is processed, it is then released from the vacuum chamber 32 by discontinuing or closing the vacuum from either of the first and second vacuum recesses. The vacuum on the other vacuum recess is then retained for allowing further manipulation and final placement of the object 12 for downstream independent processing.

The invention has been described with reference to a preferred embodiment. However, it will be appreciated that variations and modifications can be effected by a person of ordinary skill in the art without departing from the scope of the invention.

PARTS LIST 10 apparatus
12 object or component part
14 actuator
15 pivot points
16 first rotatable arm member
18 second rotatable arm member
20 first object holder or suction chamber
22 first vacuum recess
25 first support surface
26 second object holder or suction chamber
28 second vacuum recess
29 opposing second wall of second rotatable arm member 18
30 second support surface
32 vacuum chamber
34 referenced edge or closed end of the vacuum chamber 32
36 open end of vacuum chamber 32
40 alignment features
46 first wall
51 tooling flange
53 front face of first rotatable arm member 16
55 vacuum port
57 vacuum port
59 top end of the object 12

What is claimed is:

1. Method of grasping, aligning and orienting an object, comprising the steps of:

providing a formable vacuum chamber having a closed end for aligning the object contained therein and an open end for receiving the object, said formable vacuum chamber comprising first and second rotatable arm members, said first rotatable arm member having a first vacuum recess and said second rotatable arm member having a second vacuum recess, said first and second vacuum recesses forming said vacuum chamber when said first rotatable arm member rotates into an abutting contact with said second rotatable arm member, respectively, for forming said vacuum chamber, said vacuum chamber having said closed end for aligning said object and said open end for receiving said object;

rotating said first and second rotatable arm members into abutting contact such that said respective first and second vacuum recesses form said formable vacuum chamber having said closed end and said open end;

positioning said open end of said vacuum chamber in close proximity to said object to be grasped;

applying a vacuum to said vacuum chamber for drawing and securing said object within said vacuum chamber against said closed end;

removing vacuum from a select one of said first and second vacuum recesses and retaining vacuum on the other of said first and second vacuum recesses for holding said object on said other vacuum recess; and, rotating said first rotatable arm member away from said second rotatable arm member with said other vacuum recess having a vacuum for securing said object.

2. The method recited in claim 1 further comprising the step of providing alignment features arranged on either of said first and second rotatable arm members for aligning said first and second vacuum recesses.

3. The method recited in claim 1 comprising the step of synchronously rotating said first and second rotatable arm members through a substantially ninety degree angle, said step of synchronously rotating causing said first and second arm members to fully extend for independently holding and manipulating said object.

\* \* \* \* \*